(12) United States Patent
Duggan et al.

(10) Patent No.: US 9,430,284 B2
(45) Date of Patent: Aug. 30, 2016

(54) PROCESSING VIRTUAL MACHINE OBJECTS THROUGH MULTISTEP WORKFLOWS (71) Applicant: VMware, Inc., Palo Alto, CA (US)

(72) Inventors: Matthew Duggan, Boston, MA (US); David Chavez, Wilmington, MA (US); Aleksey Pershin, Fremont, CA (US); Kishore Nadimpalli, Sunnyvale, CA (US); Ilia Langouev, Santa Cruz, CA (US)

(73) Assignee: VMware, Inc., Palo Alto, CA (US)

(*) Notice: Subject to any disclaimer, the term of this patent is extended or adjusted under 35 U.S.C. 154(b) by 211 days.

(21) Appl. No.: 14/315,953

(22) Filed: Jun. 26, 2014

(65) Prior Publication Data
US 2015/0378758 A1 Dec. 31, 2015

(51) Int. Cl.
*G06F 11/00* (2006.01)
*G06F 9/48* (2006.01)
*G06F 9/455* (2006.01)
*G06F 11/07* (2006.01)

(52) U.S. Cl.
CPC ......... *G06F 9/4881* (2013.01); *G06F 9/45558* (2013.01); *G06F 11/0796* (2013.01); *G06F 2009/45575* (2013.01); *G06F 2201/805* (2013.01)

(58) Field of Classification Search
CPC .................. G06F 9/45533; G06F 11/0976
See application file for complete search history.

(56) References Cited

U.S. PATENT DOCUMENTS

| | | | | |
|---|---|---|---|---|
| 8,918,783 B2* | 12/2014 | Mattiocco | ............... | G06F 9/455 718/1 |
| 2009/0013321 A1* | 1/2009 | Mattiocco | ............... | G06F 9/455 718/1 |
| 2011/0126047 A1* | 5/2011 | Anderson | ............. | H04L 9/3213 714/15 |
| 2012/0084445 A1* | 4/2012 | Brock | ................... | G06F 9/5077 709/226 |
| 2013/0198494 A1* | 8/2013 | Grover | ...................... | G06F 8/53 712/226 |
| 2013/0198739 A1* | 8/2013 | Razdan | ............... | G06F 9/45558 718/1 |
| 2013/0283092 A1* | 10/2013 | Das | ..................... | G06F 11/1484 714/3 |
| 2013/0311824 A1* | 11/2013 | Ji | ........................ | G06F 11/1438 714/15 |
| 2014/0019960 A1* | 1/2014 | Jacklin | ............... | G06F 9/45558 718/1 |
| 2014/0082619 A1* | 3/2014 | Yoshida | .............. | G06F 11/1484 718/1 |

(Continued)

*Primary Examiner* — Christopher McCarthy

(57) ABSTRACT

Techniques to process virtual machine objects through multistep workflows in a computer system are described. In an example, a method of processing virtual machine objects through a workflow having a plurality of ordered steps in a computer system includes executing the workflow on computing resources of the computer system using the virtual machine objects as parametric input, where the computing resources: divide the virtual machine objects into workgroups; perform instances of a step of the workflow in parallel on the workgroups as the workgroups complete a prior step in the workflow; and execute an agent to delegate the workgroups to, and receive results from, the instances of the step as the workflow is executed.

17 Claims, 10 Drawing Sheets

U.S. PATENT DOCUMENTS

| | | | | |
|---|---|---|---|---|
| 2014/0196030 A1* | 7/2014 | Deshpande | ......... | G06F 9/45558 718/1 |

(56) References Cited

U.S. PATENT DOCUMENTS

| | | | |
|---|---|---|---|
| 2014/0196056 A1* | 7/2014 | Kottomtharayil | G06F 9/505 718/105 |
| 2015/0082094 A1* | 3/2015 | Li | G06F 11/3688 714/32 |
| 2015/0106809 A1* | 4/2015 | Reddy | G06F 9/45533 718/1 |
| 2015/0178105 A1* | 6/2015 | Graham | G06F 9/45558 718/1 |
| 2015/0222689 A1* | 8/2015 | Han | H04L 67/146 709/217 |
| 2015/0261582 A1* | 9/2015 | Dow | G06F 3/0647 718/1 |
| 2015/0278101 A1* | 10/2015 | Zhou | G06F 12/0811 711/119 |
| 2015/0370659 A1* | 12/2015 | Pershin | G06F 11/203 714/4.11 |
| 2015/0370660 A1* | 12/2015 | Pershin | G06F 11/203 714/4.11 |
| 2015/0372945 A1* | 12/2015 | Pershin | H04L 47/808 709/225 |

\* cited by examiner

PROCESSING VIRTUAL MACHINE OBJECTS THROUGH MULTISTEP WORKFLOWS

BACKGROUND

Environments that support execution of virtual machines running in computer systems can employ management applications to manage the virtual machines and the associated host computer systems. To perform operations on the virtual machines, the management applications can implement multistep workflows, where one or more operations are performed on the virtual machines during each step. For example, in a disaster recovery workflow, protected virtual machines are failed over from a protected site to a recovery site. The disaster recovery workflow includes multiple steps performed on the virtual machines.

When a management application executes a multistep workflow on a set of disparate objects (e.g., virtual machines), the straightforward approach is to perform each step on all the objects to completion before perform the next step. That is, a step is instantiated, all objects are processed for that step, the next step is instantiated, all objects are processed for the next step, and so on. This method of processing allows for a simple state representation for workflow execution that is valid for the entire workflow plan. The drawback to this approach is that all objects of the workflow must be available at the beginning of the workflow and must complete all steps prior to the final step before the first object can complete the workflow. For example, in a disaster recovery workflow, all protected virtual machines must be moved to the recovery site before a single virtual machine can be powered on. In addition, for large numbers of objects and/or as the workflow plan grows in size, the time to complete the first object will increase noticeably.

DETAILED DESCRIPTION

Figure 1:
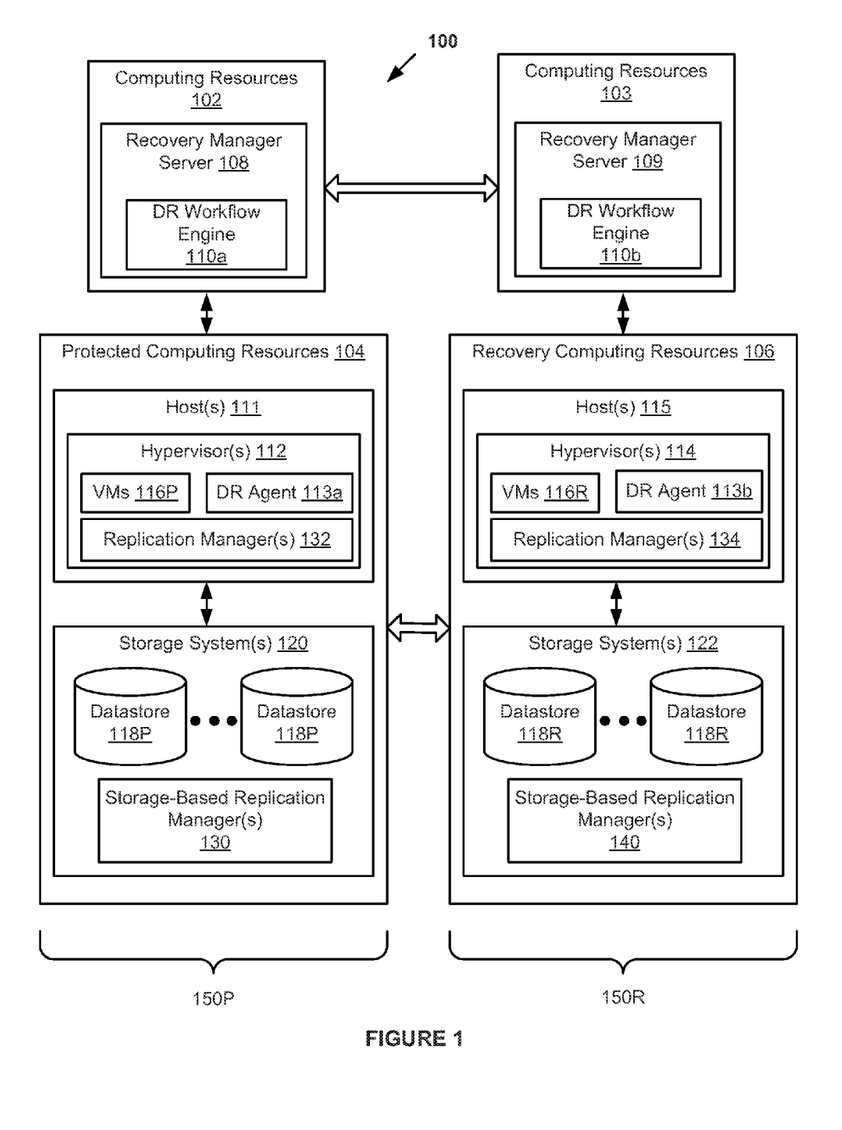
FIG. 1 is a block diagram depicting a computer system according to an example implementation.

FIG. 1 is a block diagram depicting a computer system 100 according to an example implementation. Computer system 100 includes a site 150P and a site 150R. Sites 150P, 150R include collections of computing resources that are physically and/or logically divided within computer system 100. Site 150P includes computing resources 102 and protected computing resources 104. Site 150R includes computing resources 103 and recovery computing resources 106. Computing resources 102-106 can include computer systems, storage systems, networks and associated devices, and the like. Site 150P includes protected virtual machines (VMs) executing on production computing resources. An administrator can organize the protected VMs into protection groups. A "protection group" is a container comprising VMs that are replicated to a recovery site. Protected VMs can be transferred from operating on the production computing resources to recovery computing resources at site 150R. The protected VMs can be transferred between sites 150P and 150R in response to unplanned migration (e.g., resource failure, disaster, etc.) or planned migration (generally referred to as migration). Site 150P can be referred to as a "production site," and site 150R can be referred to as a "recovery site." Protected VMs on site 150P can be failed over to site 150R. Protected VMs on site 150R can be failed back to site 150P. The terms "failed over" and "failed back" encompass both planned and unplanned migrations of VMs between sites 150P and 150R.

Computing resources 102 execute a recovery manager server 108, which provides a disaster recovery (DR) workflow engine 110a. Computing resources 103 execute a recovery manager server 109, which provides a DR workflow engine 110b. Protected computing resources 104 include one or more host computers ("host(s) 111") that execute one or more hypervisors 112, which include virtual machines (VMs) 116P that are protected. Recovery computing resources 106 include one or more host computers ("host(s) 115") that execute one or more hypervisors 114, which include VMs 116R that can be recovered after failover.

Each of hypervisor 112 and 114 can be a "bare-metal" hypervisor, such as vSphere® ESXi™ commercially available from VMware, Inc. of Palo Alto, Calif. Alternatively, one or more of hypervisor(s) 108 can execute on top of an operating system (OS), which is executing on a host. Hypervisors 112 and 114 provide a software interface layer that abstracts computing resource hardware into virtualized hardware, enabling sharing of the computing resource hardware among virtual machines. Hypervisor 112 acts as an interface between VMs 116P and protected computing resources 104, and hypervisor 114 acts as an interface between VMs 116R and recovery computing resources 106. Hypervisors 112 and 114 may run on top of an operating system or directly on respective computing resources. Hypervisor 112 includes DR agent 113, and hypervisor 114 includes DR agent 115. DR agents 113 and 115 cooperate with DR workflow engines 110a, 110b to implement a DR workflow, as described below.

VMs 116P and 116R share hardware resources of protected computing resources 104 and recovery computing resources 106, respectively. Each VM typically includes a guest operating system (OS) and virtualized system hardware (not shown) implemented in software to emulate corresponding components of an actual computer system. VMs 116P are part of protected group(s) of VMs, and hence the computing resources shared by VMs 116P are referred to as "protected computing resources." VMs 116R represent recovered VMs after failover, and hence the computing resources shared by VMs 116R are referred to as "recovery computing resources."

Each of host(s) 111 is coupled to one or more storage systems 120, and each of host(s) 115 is coupled to one or more storage systems 122. Storage systems 120, 122 can include one or more mass storage devices, associated networks, and the like. Storage system(s) 120 store datastores 118P, and storage system(s) 122 store datastores 118R. A datastore is a logical collection of files that a hypervisor uses to run virtual machines. A datastore can include one or more virtual disks, which store files and data for guest operating systems and applications running in the virtual machines. A datastore can also store VM configuration file(s), file(s) that contain VM snapshot(s), and the like used by a hypervisor to configure and run VMs. Datastores 118P store files for protected VMs, and datastores 118R store files for recovered VMs. Datastores 118P, 118R are abstracted from the underlying mass storage of storage systems 120, 122. For example, a given datastore can be stored on one or more logical units (LUNs) of a storage system. Alternatively, a given LUN of a storage system can store one or more datastores.

In an embodiment, storage system(s) 120 include storage-based replication manager(s) 130, and storage system(s) 122 include storage-based replication manager(s) 140. Storage-based replication managers 130, 140 can control replication of datastores and associated VMs between sites 150P and 150R. In another embodiment, hypervisor(s) 112 can include replication manager(s) 132, and hypervisor(s) 114 can include replication manager(s) 134. Replication managers 132, 134 can control replication of VMs between sites 150P and 150R. Some hypervisors can replicate individual VMs to existing datastores. Other hypervisors can replicate the VMs by replicating the datastores on which the VMs reside. Storage-based replication managers 130, 140 can operate together with replication managers 132, 134, in place of replication managers 132, 134, or can be omitted in favor of only replication managers 132, 134.

Recovery manager servers 108, 109 manage disaster recovery for sites 150P and 150R. Recovery manager servers 108, 109 can implement multistep workflows ("workflows") using workflow engines. A workflow is a sequence of steps to be performed on a given set of VM objects, where each "step" can include one or more operations or sub-steps. In some examples, some or all of the VM objects operated on by a workflow can be organized in "workgroups". VM objects can represent VMs and associated units of storage (e.g., a logical collection of files used by a hypervisor to run the VMs). Each workgroup is a defined set of VM objects that will be processed through the workflow as one logical unit. In an embodiment, each workgroup includes a protection group of VMs defined by an administrator. The VM objects in a workgroup can be related by one or more metrics, such as a priority, function, or the like. Prior to executing a workflow, a user of VM management server(s) 108 can establish a "workflow plan", which is a container for a set of workgroups that will be processed through the workflow. Workflow engine(s) represent and control execution of workflow(s).

In computer system 100, each of DR workflow engines 110a, 110b implements a DR workflow. A DR workflow can implement failover of VMs 116P to VMs 116R, or fail back of VMs 116R to VMs 116P. A user can initiate the DR workflow, or the DR workflow can be initiated automatically, in response to some impairment of computing resources. VMs 116P can be part of one or more workgroups to be processed by DR workflow. An example VM management server that provides disaster recovery is vSphere® vCenter™ Site Recovery Manager™ commercially available from VMware, Inc. of Palo Alto, Calif.

While VMs 116P are operating, VMs 116R are not operating and datastores 118P are being replicated to datastores 118R. In case of disaster recovery, initially none of VMs 116P and 116R are operating. DR workflow engine 110 can begin a DR workflow that processes datastores 118R in order to bring online VMs 116R, effectively failing over VMs 116P to VMs 116R. After the DR workflow is complete, VMs 116R are operating in place of VMs 116P. The same process works in reverse for fail back of VMs 116R to VMs 116P.

As discussed below, workflow engine(s), including DR workflow engines 110a and 110b, can implement pipelined execution of workflow(s). In pipelined execution, a workflow engine treats the workgroups as independent entities that can proceed through all steps of a workflow without regard for the state of other workgroups. In an example, a workflow engine orders processing for workflow groups by leveraging metrics, such as priority, assigned to the workgroups. In this manner, selected workgroups (e.g., higher priority workgroups) immediately proceed to the next step once completing a current step without waiting for other workgroups to complete the current step. Workflow engine(s) can leverage parallel processing to provide decreased execution time for workgroups and allow selected workgroups (e.g., higher priority workgroups) to finish the workflow as quickly as possible. In some examples, workflow engine(s) can also further optimize execution by batching workgroups. For example, a current step of the workflow can wait for a prior step to complete processing a plurality of workgroups. Once the prior step completes processing of a particular number of workgroups, referred to as a batch of workgroups, the current step processes the batch. Batching of workgroups for a step at once can provide a benefit of minimized overhead for the step. A workflow engine can configure thresholds for batching at particular steps within the overall context of pipelined execution. Thus, workflow engine(s) can provide both pipelined execution and batching optimizations to increase overall performance of workflow(s) as compared to pure non-pipelined execution.

Figure 2:
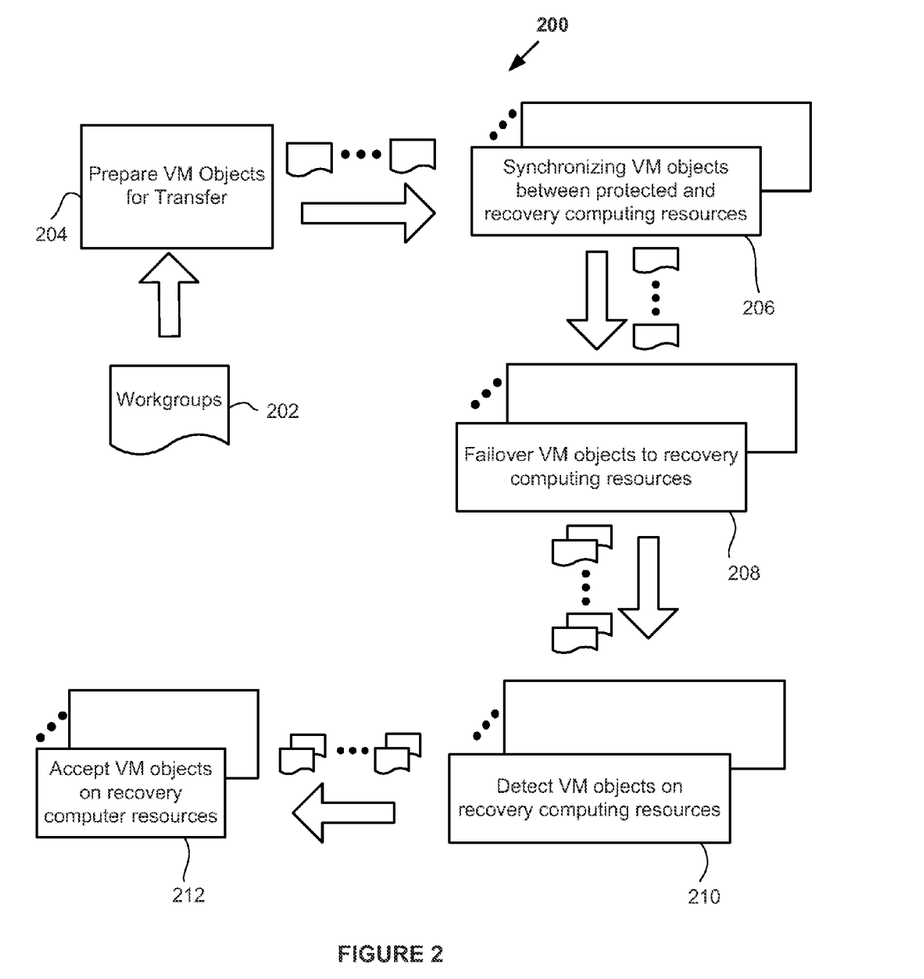
FIG. 2 is a flow diagram depicting a disaster recovery workflow implemented by a workflow engine according to an example implementation.

FIG. 2 is a flow diagram depicting a disaster recovery workflow 200 implemented by DR workflow engine 110 according to an example implementation. FIG. 2 can be understood with simultaneous reference to FIG. 1. In the present example, the workflow is a DR workflow, and the VM objects are VMs and associated units of storage. DR workflow 200 processes workgroups to implement failover of VMs 116P to VMs 116R. Each workgroup is a protection group having at least one VM object. DR workflow engine 110 implements a combination of pipelined execution and batching using VM objects as parametric input. VM objects can be grouped based on a metric, such as priority. In this manner, DR workflow engine 110 can completely process higher priority VMs through DR workflow before lower priority VMs. Higher priority VMs can then begin operation as soon as possible without waiting for DR workflow engine 110 to process all VMs.

DR workflow engine 110b delegates processing of workgroups (hereinafter referred to as "delegating workgroups") to an instance of step 204, which prepares the protection groups for transfer from protected computing resources 104 to recovery computing resources 106. In an example, DR workflow engine 110b implements one instance of step 204 to process each of workgroups 202 individually. In an example, DR workflow engine 110b can delegate workgroups 202 to step 204 based on metric data associated with workgroups 202, such as priority data. In this manner, higher priority VMs will begin the DR workflow before lower priority VMs.

Step 204 can include various operations, such as "power off", "deactivate unmount", "deactivate detach", and "deactivate prepare failover" operations. In a "power off" operation, DR workflow engine 110b powers off VMs 116P. In a "deactivate unmount" operation, DR workflow engine 110b unmounts datastores 118P from protected computing resources 104. In a "deactivate detach" operation, DR workflow engine 110b detaches mass storage associated with datastores 118P (e.g., logical units (LUNs) of storage). In a "deactivate prepare failover" operation, DR workflow engine 110 designates datastores 118P read-only in preparation for transfer of execution of the protection groups on the recovery computing resources 106.

DR workflow engine 110 delegates workgroups that have completed step 204 to a step 206, where datastores 118P are synchronized with datastores 118R on recovery computing resources 106. DR workflow engine 110 creates an instance of step 204 for each available workgroup as the workgroups complete step 204. Thus, DR workflow engine 110 implements pipelined execution of step 206.

DR workflow engine 110 delegates workgroups that have completed any instance of step 206 to a step 208, where datastores 118P are failed over to datastores 118R on recovery computing resources 106. In the failover operation, datastores 118R are made available on recovery computing resources 106. That is, before failover, the datastores 118R are not mounted and are not accessible by hypervisor(s) 114. During failover, datastores 118R can be made available on recovery computing resources 106 by mounting datastores 118R for access by hypervisor(s) 114. DR workflow engine 110 creates an instance of step 208 for each available workgroup as the workgroups complete any instance of step 206. Thus, DR workflow engine 110 implements pipelined execution of step 208.

DR workflow engine 110 delegates a batch of workgroups that have completed instances of step 208 to a step 210, where datastores 118R are detected on recovery computing resources 106. The detection or "rescan" operation can operate on multiple workgroups at one time and hence the workgroups are batched at step 210. DR workflow engine 110 can instantiate an instance of step 210 for each available batch of workgroups. DR workflow engine 110 implements batching or a combination of pipelined execution and batching for step 210.

DR workflow engine 110 delegates a batch of workgroups that have completed instances of step 210, where datastores 118R are accepted on recovery computing resources 106. The acceptance or "resignature" operation can operate on multiple workgroups at one time and hence the workgroups are batched at step 212. DR workflow engine 110 can create an instance of step 212 for each available batch of workgroups. DR workflow engine 110 implements batching or a combination of pipelined execution and batching for step 212.

Figure 3:
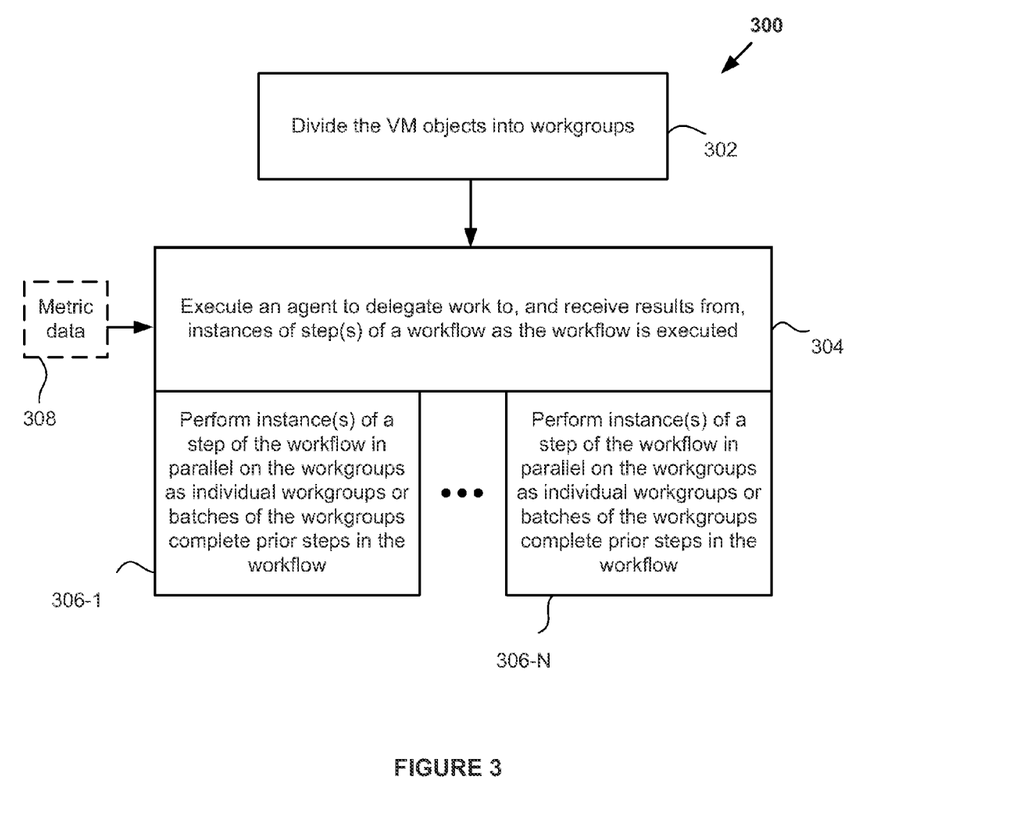
FIG. 3 is a flow diagram depicting a method of processing VM objects through a workflow having a plurality of ordered steps in a computer system according to an example implementation.

FIG. 3 is a flow diagram depicting a method 300 of processing VM objects through a workflow having a plurality of ordered steps in a computer system according to an example implementation. Each of DR workflow engines 110a, 110b can implement method 300. Hence, method 300 will be discussed in context of being performed by a workflow engine in a VM management server, such as a DR workflow engine in a recovery manager server. Method 300 begins at step 302, where the workflow engine divides the VM objects into workgroups. In some examples, a user may have predefined the VM objects into groups, such as protection groups, in which case the workflow engine accepts the predefined workgroups. In other examples, the workflow engine can create workgroups based on one or more metrics associated with the VM objects, such as priority, function, or the like. For example, the workflow engine can group VM objects according to priority to establish the workgroups absent any predefined grouping.

At step 304, the workflow engine executes an agent to delegate work to, and receive results from, instances of step(s) of a workflow as the workflow is executed. As discussed above, each step comprises at least one operation to be performed on VM objects in a workgroup. For each step, the workflow engine can instantiate one or more processes or "instances" of the step to process distinct workgroups or batches of workgroups. Notably, the workflow engine can perform steps 306-1 through 306-N (collectively step 306) for N corresponding steps of the workflow, where N is an integer greater than or equal to one. At each of steps 306-1 through 306-N, the workflow engine performs instance(s) of a step of the workflow in parallel on the workgroups as individual workgroups or batches of the workgroups complete prior steps in the workflow.

Consider a current step that accepts individual workgroups as input. As each workgroups completes a prior step (e.g., a first step), the current step (e.g., a second step) processes the workgroups individually. Rather than wait for all workgroups to complete the prior step, the workflow engine instantiates multiple instances of the current step to process each available workgroup. These instances of the current step operate in parallel to each other and also to other instances of other steps. For example, a DR workflow can include a step of synchronizing protected datastores with recovery datastores, where the synchronizing step can operate on individual workgroups as each workgroup completes the prior step of preparing the protection groups. In another example, a DR workflow can include a step of failover after synchronization, where the failover step can operate on individual workgroups as each workgroup completes the synchronization step.

Consider a current step that accepts a batch of workgroups as input. As each workgroup completes a prior step (e.g., a first step), the workflow engine accumulates a plurality of workgroups into a batch. When a threshold number of workgroups is ready for processing by the current step (e.g., a second step), the workflow engine instantiates an instance of the current step to process the available batch of workgroups. When another batch is available, the workflow engine can instantiate another instance of the current step to process another batch of workgroups. For example, a DR workflow can include a step of detecting datastores on recovery computing resources after they have been made available (e.g., mounted). The detection operation can operate on multiple workgroups at once as a batch, rather than individually processing workgroups as they become available. In another example, a DR workflow can include a step of accepting the datastores on recovery computing resources after detection. The acceptance operation can operate on multiple workgroups at once as a batch.

In another example, consider a current step that accepts either individual workgroups or a batch of workgroups, but cannot execute with multiple instances. In such an example, the workflow engine will create only a single instance of the step and process each workgroup as the workgroups complete a prior step.

In some embodiments, at step 304, the workflow engine can consider metric data 308 associated with the workgroups, such as priority data, when executing the workflow. The workflow engine can prioritize workgroup processing based on metric data 308. For example, metric data 308 can include an indication of priority associated with each workgroup. The workflow engine can begin processing higher priority workgroups before processing lower priority workgroups. Thus, at a first step of the workflow, the workflow engine can process available workgroups in order of priority.

Figure 4:
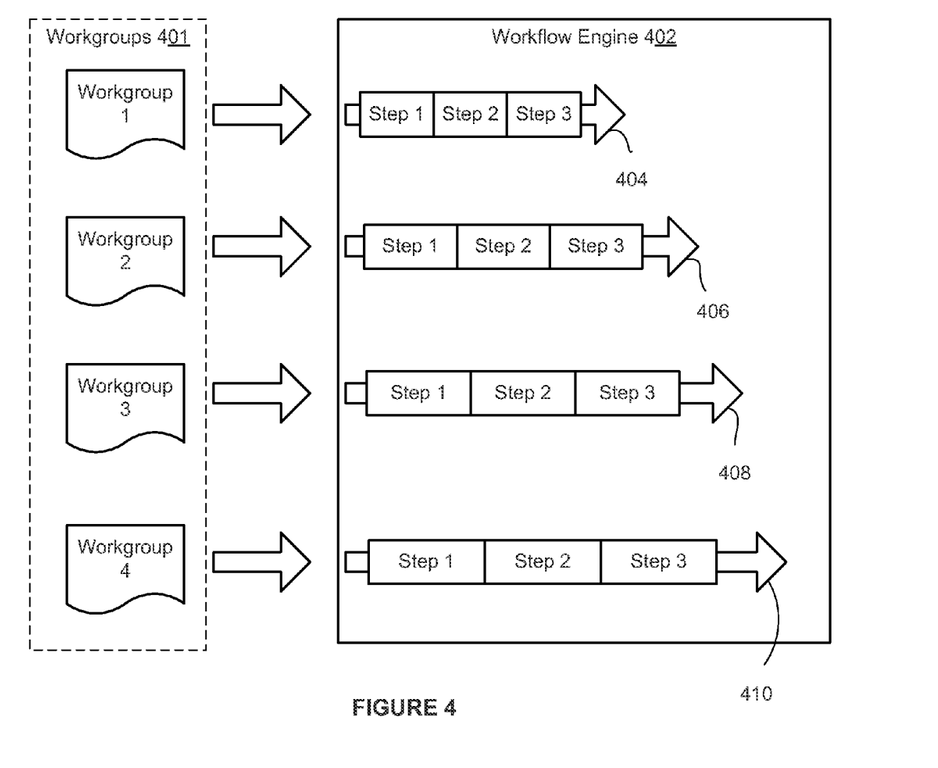
FIG. 4 depicts a block diagram showing an example of a workflow engine processing workgroups according to an example implementation.

FIG. 4 depicts a block diagram showing an example of a workflow engine 402 processing workgroups 401 according to an example implementation. In the example, workgroups 401 include four workgroups designated workgroup 1 through workgroup 4. Workflow engine 402 implements four pipelines 404 through 410 to process workgroups 1 through 4, respectively. Each pipeline 404-410 implements instances of three steps, designated step 1, step 2, and step 3. Steps 1-3 represent steps of a given workflow implemented by workflow engine 402. Some pipelines in workflow engine 402 take longer to complete than other pipelines. For example, pipeline 410 takes longer than pipeline 408, which takes longer than pipeline 406, which takes longer than pipeline 404. In such an example, workgroup 1 may represent higher priority VM objects than workgroups 2-4. Since workflow engine 402 implements pipelined processing, higher-priority workgroup 1 can complete the workflow as soon as possible without waiting for workgroups 2-4 to complete.

Figure 5A:
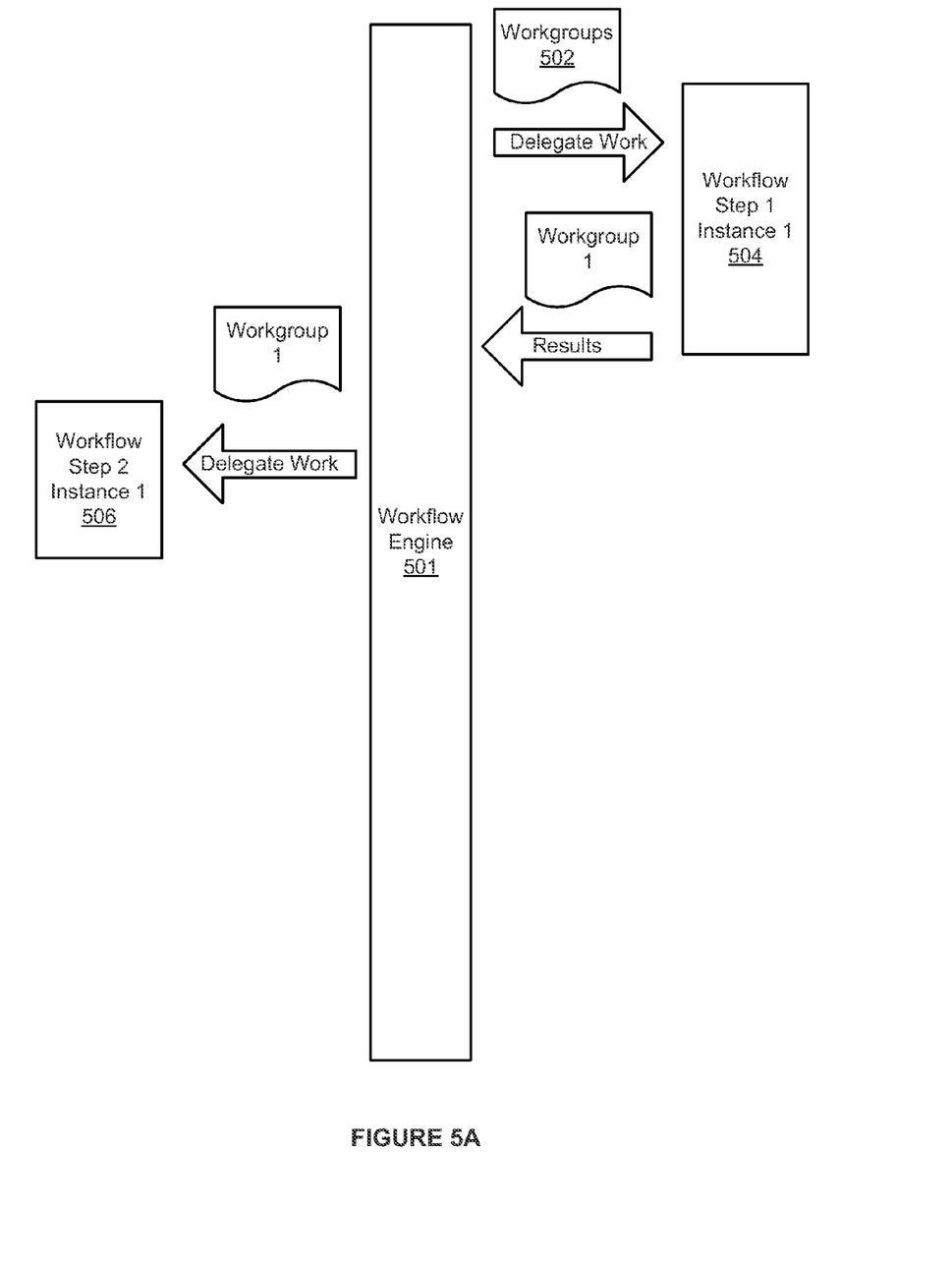
FIGS. 5A-5E show an example of a workflow engine that implements both pipelined execution and batch according to an example implementation.

FIGS. 5A-5E show an example of a workflow engine 501 that implements both pipelined execution and batching according to an example implementation. As shown in FIG. 5A, workflow engine 501 delegates workgroups 502 to a first instance of a first step of a workflow ("instance 504"). Instance 504 returns results to workflow engine 601 as each workgroup is completed, including a workgroup 1. Workflow engine 501 delegates workgroup 1 to a first instance of the second step ("instance 506").

Figure 5B:
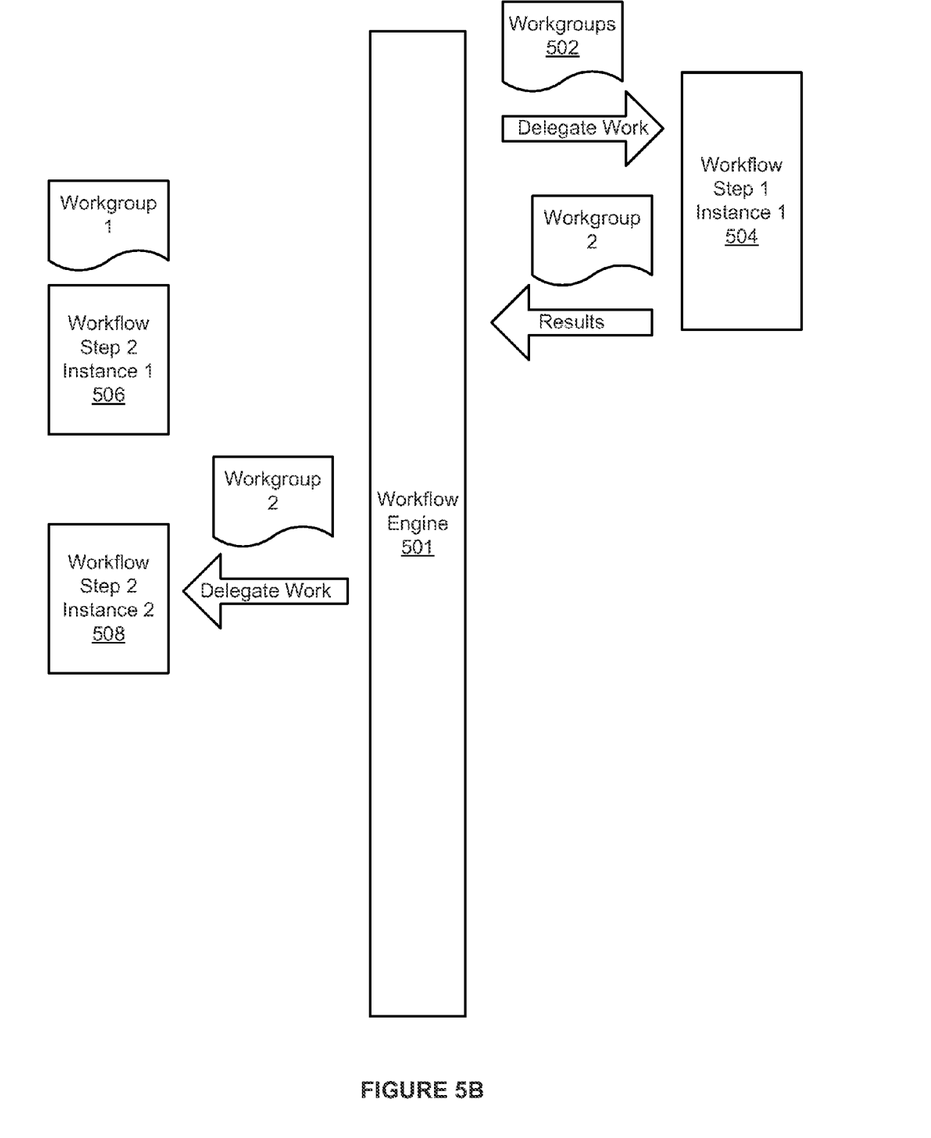

As shown in FIG. 5B, instance 504 returns workgroup 2 to workflow engine 501. Instance 506 of the second step is still processing workgroup 1. Workflow engine 501 delegates workgroup 2 to a second instance of the second step ("instance 508"). Thus, workflow engine 501 processes workgroups 1 and 2 in parallel using two instances of the second step. Each of workgroups 1 and 2 is processed as each individual workgroup completes the instance 504 of the first step.

Figure 5C:
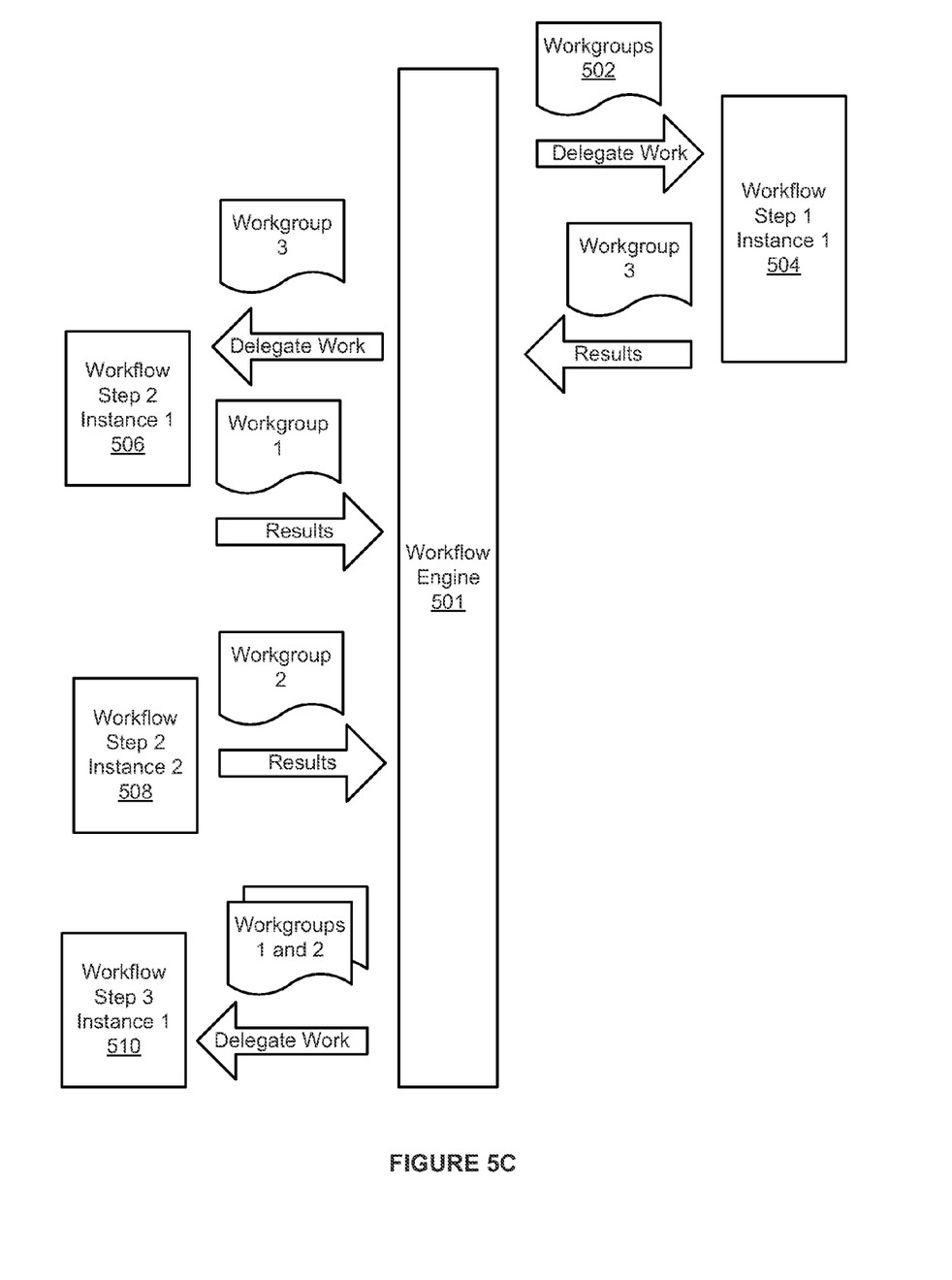

As shown in FIG. 5C, assume that a third step accepts a batch of two workgroups as input. Instance 504 returns workgroup 3 to workflow engine 501. Instance 506 of the second step has completed processing workgroup 1 and returns results to workflow engine 501. Likewise, instance 508 of the second step has completed processing workgroup 2 and returns results to workflow engine 501. Workflow engine 501 delegates workgroup 3 to the instance 506. Workflow engine 501 delegates a batch of workgroups 1 and 2 to a first instance of the third step ("instance 510").

Figure 5D:
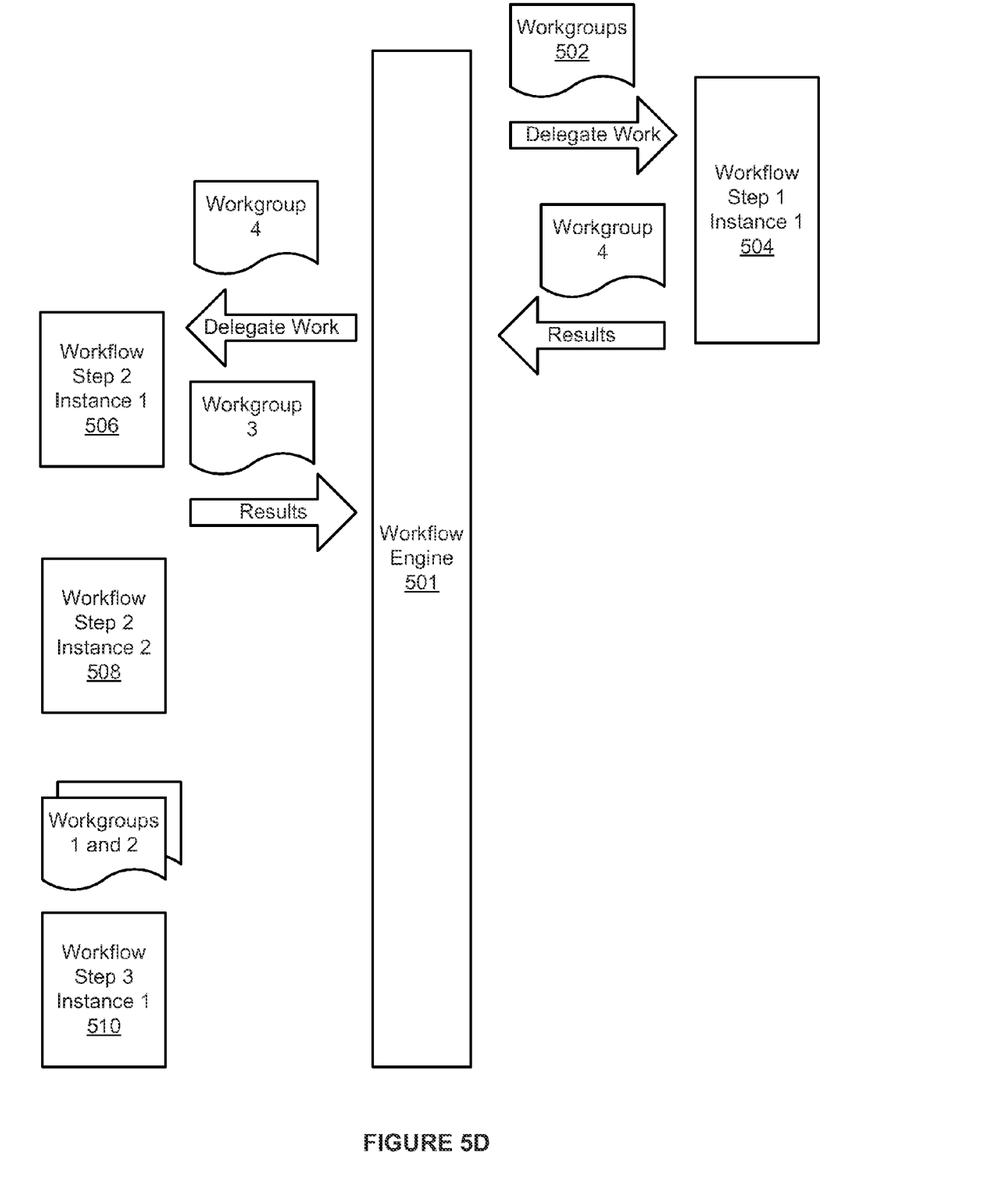

As shown in FIG. 5D, instance 504 returns workgroup 4 to workflow engine 501. Instance 506 of the second step has completed processing workgroup 3 and returns results to workflow engine 501. Workflow engine 501 delegates workgroup 4 to instance 506 of the second step. Instance 508 remains idle or can be terminated. Instance 510 of the third step continues to process the batch of workgroups 1 and 2. Workflow engine 501 queues workgroup 3, since workflow engine 501 does not have enough workgroups at present to form a batch that can be delegated to another instance of the third step.

Figure 5E:
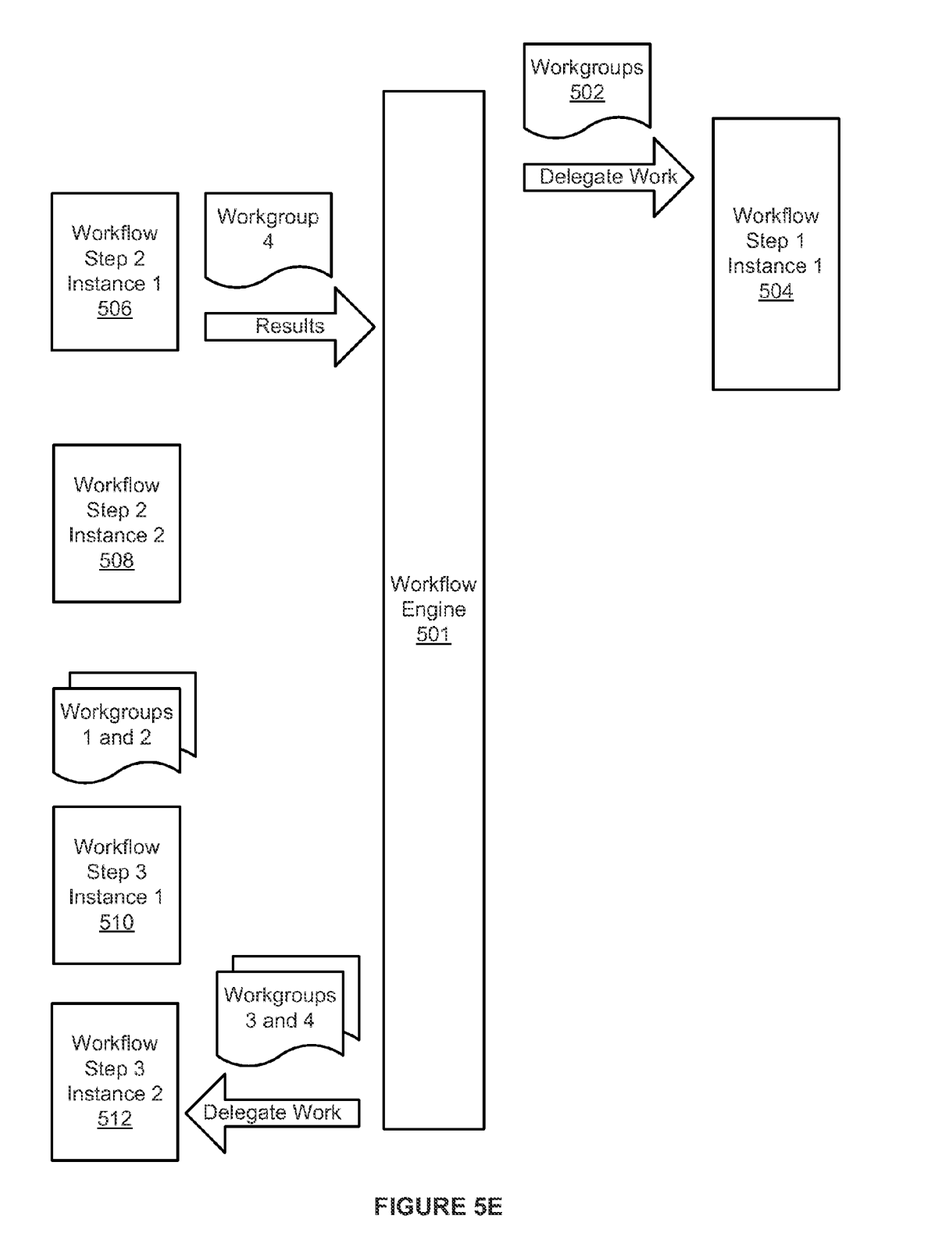

As shown in FIG. 5E, the instance 506 returns workgroup 4 to workflow engine 501. Instance 510 of the third step continues to process the batch of workgroups 1 and 2. Workflow engine 501 delegates a batch of workgroups 3 and 4 to a second instance of the third step ("instance 512"). As shown in FIGS. 5A-5E, different instances of the same step can be performed in parallel as workgroup(s) complete a prior step in the workflow. In addition, instance(s) of different steps can be performed in parallel, allowing different workgroups to progress through the workflow at different rates. Workgroup(s) can traverse the steps of the workflow independently, without waiting for other workgroup(s) to complete prior step(s).

The technique to process VM objects through multistep workflows described herein can be applied to various applications. In an example, the technique is applied to a disaster recovery (DR) workflow, as described above.

Figure 6:
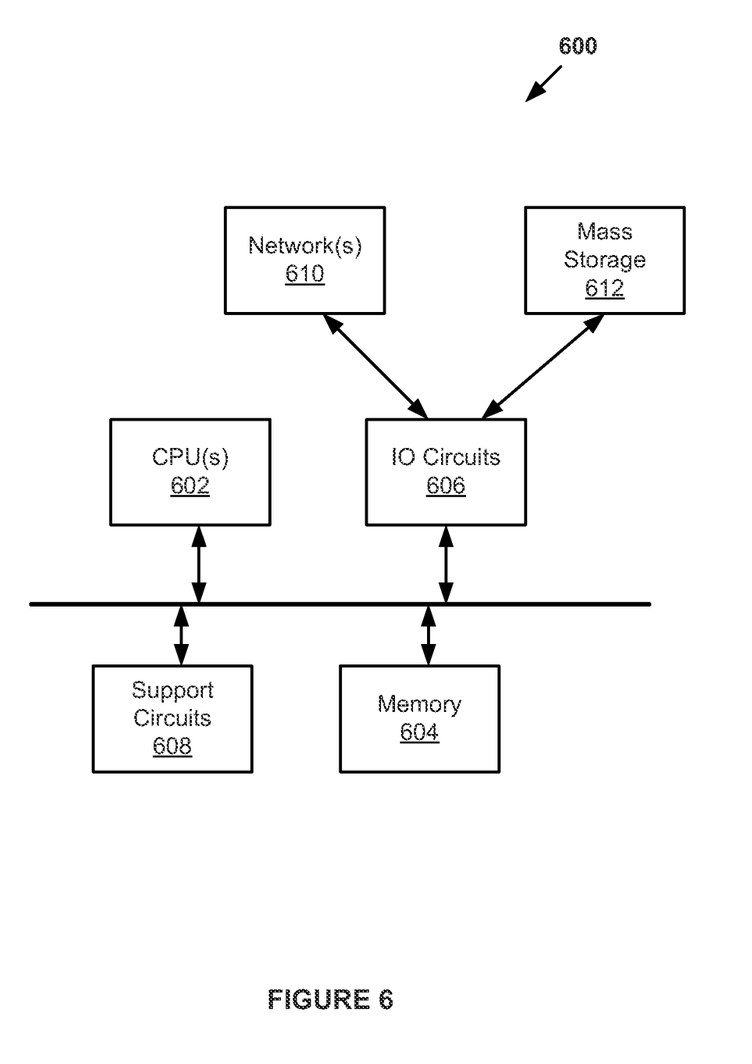
FIG. 6 is a block diagram depicting computing resources according to an example implementation.

FIG. 6 is a block diagram depicting computing resources 600 according to an example implementation. Computing resources 600 can be used to implement any of the computing resources described above in FIGS. 1-5. Computer resources 600 include one or more central processing units (CPUs) 602, memory 604, input/output (IO) circuits 606, various support circuits 608, network(s) 610, and mass storage 612. Each of CPUs 602 can include any microprocessor known in the art and can execute instructions stored on computer readable storage, such as memory 604 or mass storage 612. Memory 604 can include various volatile and/or non-volatile memory devices, such as random access memory (RAM), read only memory (ROM), and the like. Mass storage 612 can include various persistent storage devices, such as hard disc drives, solid state disk drives, and the like. Instructions for performing the various methods and techniques described above can be stored in memory 604 and/or mass storage 612 for execution by CPUs 602. IO circuits 606 facilitate access to networks 610, mass storage 612, and like systems for CPUs 602. Support circuits 608 include various circuits used to support operation of a computer system as known in the art.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of processing virtual machine objects through a workflow having a plurality of ordered steps in a computer system, comprising:
   executing the workflow on computing resources of the computer system using the virtual machine objects as parametric input, where the computing resources:
   divide the virtual machine objects into workgroups;
   perform instances of a step of the workflow in parallel on the workgroups as the workgroups complete a prior step in the workflow; and
   execute an agent to delegate the workgroups to, and receive results from, the instances of the step as the workflow is executed wherein the workflow comprises a recovery workflow to recover the virtual machine objects from protected computing resources in the computer system to recovery computing resources in the computer system, and wherein each workgroup comprises a plurality of datastores sharing an associated priority.

2. The method of claim 1, wherein the computing resources obtain a priority associated with each workgroup and perform the step of the workflow on the workgroups according to the priority.

3. The method of claim 1, wherein the computing resources:
   perform at least one instance of the prior step on the workgroups; and
   perform the instances of the step on each of the workgroups as each of the workgroups completes the prior step.

4. The method of claim 1, wherein the computing resources:
   perform at least one instance of the prior step on the workgroups; and
   perform the instances of the step on batches of the workgroups as each plurality of the workgroups comprising a batch complete the prior step.

5. The method of claim 1, wherein each of the virtual machine objects comprises a virtual machine and an associated unit of storage.

6. The method of claim 1, wherein the plurality of ordered steps of the workflow include:
   a step of preparing virtual machine objects for transfer from the protected computing resources to the recovery computing resources that operates on the workgroups in order of priority;
   a step of synchronizing the virtual machine objects between the protected and recovery computing resources that operates on each of the workgroups as each workgroup completes the step of preparing;
   a step of failover of the workgroups from the protected computing resources to the recovery computing resources that operates on each of the workgroups as each workgroup completes the step of synchronizing;
   a step of detecting the workgroups at the recovery computing resources that operates on batches of the workgroups as each plurality of the workgroups comprising a batch completes the step of failover; and
   a step of accepting the workgroups at the recovery computing resources on batches of the workgroups as each plurality of the workgroups comprising a batch completes the step of detecting.

7. A non-transitory computer-readable storage medium comprising instructions, which when executed in a computer system, causes the computer system to carry out the steps of:
   executing a workflow having a plurality of ordered steps using virtual machine objects as parametric input by:
   dividing the virtual machine objects into workgroups;
   performing instances of a step of the workflow in parallel on the workgroups as the workgroups complete a prior step in the workflow; and
   executing an agent to delegate the workgroups to, and receive results from, the instances of the step as the workflow is executed wherein the workflow comprises a recovery workflow to recover the virtual machine objects from protected computing resources to recovery computing resources, and wherein each workgroup comprises a plurality of datastores sharing an associated priority.

8. The non-transitory computer-readable storage medium of claim 7, wherein the computer system obtains a priority associated with each workgroup and performs the step of the workflow on the workgroups according to the priority.

9. The non-transitory computer-readable storage medium of claim 7, wherein the computer system:

performs at least one instance of the prior step on the workgroups; and performs the instances of the step on each of the workgroups as each workgroup completes the prior step.

10. The non-transitory computer-readable storage medium of claim 7, wherein the computer system:

performs at least one instance of the prior step on the workgroups; and performs the instances of the step on batches of the workgroups as each plurality of the workgroups comprising a batch completes the prior step.

11. The non-transitory computer-readable storage medium of claim 7, wherein each of the virtual machine objects comprises a virtual machine and an associated unit of storage.

12. The non-transitory computer-readable storage medium of claim 7, wherein the plurality of ordered steps of the workflow include:

a step of preparing virtual machine objects for transfer from the protected computing resources to the recovery computing resources that operates on the workgroups in order of priority;

a step of synchronizing the virtual machine objects between the protected and recovery computing resources that operates on each of the workgroups as each workgroup completes the step of preparing;

a step of failover of the workgroups from the protected computing resources to the recovery computing resources that operates on each of the workgroups as each workgroup completes the step of synchronizing;

a step of detecting the workgroups at the recovery computing resources that operates on batches of the workgroups as each plurality of the workgroups comprising a batch completes the step of failover; and a step of accepting the workgroups at the recovery computing resources that operates on batches of the workgroups as each plurality of the workgroups comprising a batch completes the step of detecting.

13. A computer system including a virtual machine management server running thereon, wherein the virtual machine management server is programmed to execute a workflow of steps on workgroups of virtual machine objects by performing instances of a step of the workflow in parallel on the workgroups as the workgroups complete a prior step in the workflow, and executing an agent to delegate the workgroups to, and receive results from, the instances of the step as the workflow is executed wherein the workflow comprises a recovery workflow to recover the virtual machine objects from protected computing resources in the computer system to recovery computing resources, and wherein each workgroup comprises a plurality of datastores sharing an associated priority.

14. The computer system of claim 13, wherein the virtual machine management server is programmed to obtain a priority associated with each workgroup and performs the step of the workflow on the workgroups according to the priority.

15. The computer system of claim 13, wherein the virtual machine management server is programmed to:

perform at least one instance of the prior step on the workgroups; and perform the instances of the step on each of the workgroups as each workgroup completes the prior step.

16. The computer system of claim 13, wherein the virtual machine management server is programmed to:

perform at least one instance of the prior step on the workgroups; and perform the instances of the step on batches of the workgroups as each plurality of the workgroups comprising a batch completes the prior step.

17. The computer system of claim 13, wherein the steps of the workflow include:

a step of preparing virtual machine objects for transfer from the protected computing resources to the recovery computing resources operating on the workgroups in order of priority;

a step of synchronizing the virtual machine objects between the protected and recovery computing resources operating on each of the workgroups as each workgroup completes the step of preparing;

a step of failover of the workgroups from the protected computing resources to the recovery computing resources operating on each of the workgroups as each workgroup completes the step of synchronizing;

a step of detecting the workgroups at the recovery computing resources operating on batches of the workgroups as each plurality of the workgroups comprising a batch completes the step of failover; and a step of accepting the workgroups at the recovery computing resources operating on batches of the workgroups as each plurality of the workgroups comprising a batch completes the step of detecting.

* * * * *